(12) United States Patent
Snell et al.

(10) Patent No.: US 9,160,619 B2
(45) Date of Patent: Oct. 13, 2015

(54) CALL FLOW DIAGNOSTIC SYSTEM FOR HETEROGENEOUS NETWORKS

(71) Applicant: Pacific Star Communications, Inc., Portland, OR (US)

(72) Inventors: Rodney Snell, Portland, OR (US); Thomas Maier, Tualatin, OR (US)

(73) Assignee: Pacific Star Communications, Inc., Portland, OR (US)

( * ) Notice: Subject to any disclaimer, the term of this patent is extended or adjusted under 35 U.S.C. 154(b) by 55 days.

(21) Appl. No.: 13/863,867

(22) Filed: Apr. 16, 2013

(65) Prior Publication Data

US 2014/0071808 A1    Mar. 13, 2014

Related U.S. Application Data

(60) Provisional application No. 61/624,945, filed on Apr. 16, 2012.

(51) Int. Cl.
*H04L 12/703* (2013.01)
*H04L 12/24* (2006.01)
*H04L 1/00* (2006.01)

(52) U.S. Cl.
CPC .............. *H04L 41/0672* (2013.01); *H04L 41/16* (2013.01); *H04L 41/22* (2013.01)

(58) Field of Classification Search
None
See application file for complete search history.

(56) References Cited

U.S. PATENT DOCUMENTS

| 5,049,873 | A  * | 9/1991 | Robins et al. | 370/254 |
| 7,555,566 | B2 * | 6/2009 | Blumrich et al. | 709/249 |
| 2011/0122866 | A1 * | 5/2011 | Vasamsetti et al. | 370/352 |
| 2012/0173905 | A1 * | 7/2012 | Diab et al. | 713/320 |

* cited by examiner

*Primary Examiner* — Eunsook Choi
(74) *Attorney, Agent, or Firm* — Perkins Coie LLP

(57) ABSTRACT

A call flow diagnostic system and/or methods for monitoring, diagnosing and updating a communication network for high bandwidth, real time, feature-rich voice/video communications. An interface component is operatively coupled to the communication network. A monitoring and alert component coupled to the network devices monitors in real time transmission and device status, and the condition, state, routing, transmission, transformation settings, and packet or call routing settings of the network devices. The component collects, debugs and traces information from the network devices. A graphical user interface is coupled to the monitoring and alert component and displays information to an operator about network device status, diagnostics results, alerts, instructions in real time.

18 Claims, 5 Drawing Sheets

Fig. 4

CALL FLOW DIAGNOSTIC SYSTEM FOR HETEROGENEOUS NETWORKS

CROSS-REFERENCE TO RELATED APPLICATION

This application claims priority to and the benefit of U.S. Provisional Patent Application No. 61/624,945, titled Call Flow Diagnostic System For Heterogeneous Networks, filed Apr. 16, 2012, which is incorporated herein in its entirety by reference thereto.

TECHNICAL FIELD

The present disclosure relates to the field of diagnosing and controlling the flow of voice/video calls over computer networks.

BACKGROUND

Conducting operations in field, emergency, or temporary situations suffer from communications challenges where network based, wired, line-of-site radio, radio, cellular, microwave, laser or satcom-based communications may need to be setup quickly by equipment operators. However, the equipment used to create such communications is complex and requires extensive training to set up and operate. The problem is exacerbated by the increasing complexity of the systems—required to support growing reliance on ever-more advanced communications methods such as cellular data, video, text chat, and unified communications.

Typically, to deploy these systems, organizations include the following types of networking equipment routers (used to direct the flow of voice/data), voice/packet compression and optimization equipment (used to reduce the size of network traffic over long distance radio links), PBXs (used to manage voice and video calls), digital radios and satellite modems (used to transmit data over wireless links), and firewalls, VPNs and/or encryption devices (used to ensure communications remain confidential and protected from network attacks).

Often, the equipment listed above is manufactured by different companies, providing different services—each with unique user interfaces and operator training requirements. This results in expensive training costs to educate operators on the equipment, lengthy setup times that often result in communications delays, system or communications downtime including when equipment is mis-configured, and system unavailability, such as when a lack of trained experts results in systems being left unused.

This problem is particularly acute in the setup and configuration of voice/video communications, which put a particularly difficult burden on equipment operators because of the complexity of those types of communications—voice/video is high bandwidth, real time, feature-rich—requiring multiple network devices to be configured in a cooperative manner, to facilitate the correct functioning of the transmissions. In order to configure the equipment appropriately, operators must be trained to diagnose and troubleshoot multiple, different network devices simultaneously, in real time.

SUMMARY

The present invention provides computer application software, computer readable medium, systems and methods for diagnosing and/or diagnosing call data, including call flow, in heterogeneous networks that overcome drawbacks in the prior art and provides other benefits. At least one embodiment provides a method of monitoring, diagnosing and updating a communication network having a plurality of operatively interconnected network devices. The method includes monitoring with a monitor and alert system status, transmissions, parameters, settings and changes in the network devices of the communication network, wherein the network devices include one or more transmission technologies and protocols. The method includes diagnosing with the monitor and alert system state, transmission, routing, and data transformation settings of a plurality of the network devices. The method also includes collecting, debugging, and tracing information from the plurality of network devices related to performance thereof for communication of voice or video calls via the communication network. The method also includes determining any communications failure in or between the network devices in real time and a likely cause of the communications failure, determining a correction to the communications failure in real time, and providing instructions for changes to the settings of one or more of the network devices to correct the communications failure.

Another embodiment of the technology provides a computer-readable medium storing instructions that, if executed by a computing system having a processor, cause the computing system monitor with a monitor and alert system status, transmissions, parameters, settings and changes in network devices of a communication network. The computing system also diagnoses in real time with the monitor and alert system a state, transmission, routing, and data transformation settings of a plurality of the network devices. The computing system also debugs and traces information from the network devices related to performance thereof for communication of voice or video calls via the communication network. The computing system also determines any failure in or between the network devices and a likely cause of the failure. The computing system also determines a correction to the failure in real time, and provides instructions for changes to settings of one or more of the network devices to correct the failure.

Another embodiment of the technology provides a call monitoring and diagnosing system for use with a communication network having one or more transmission devices coupled to a plurality of heterogeneous network devices incorporating one or more selected transmission technologies and protocols, and being operatively interconnected for high bandwidth, real time, feature-rich voice/video communications. The system comprises a device interface component operatively coupled to the communication network, and a monitoring and alert component coupled to the network devices via the device interface component. The monitoring and alert system monitors the status and quality of transmissions, and monitors and diagnoses condition, state, transmission, transformation settings, and packet or call routing settings of a plurality of the network devices in real time. The monitoring and alert system collects, debugs and traces information from the network devices. The monitoring and alert component is configured to provide status reports related to the communication network. The monitoring and alert component communicates with the network devices with one or more selected protocol or API to receive status and performance information in real time and on command. A graphical user interface is coupled to the monitoring and alert component and is configured to provide display information to an operator related to status and diagnostics results for the network devices, and to provide alerts, instructions, and communications related to settings of the network devices and changes thereto in real time.

BRIEF DESCRIPTION OF DRAWINGS

Embodiments of the present invention are described by way of exemplary embodiments, but not limitations, illustrated in the accompanying drawings in which like references denote similar elements, and in which:

Figure 4:
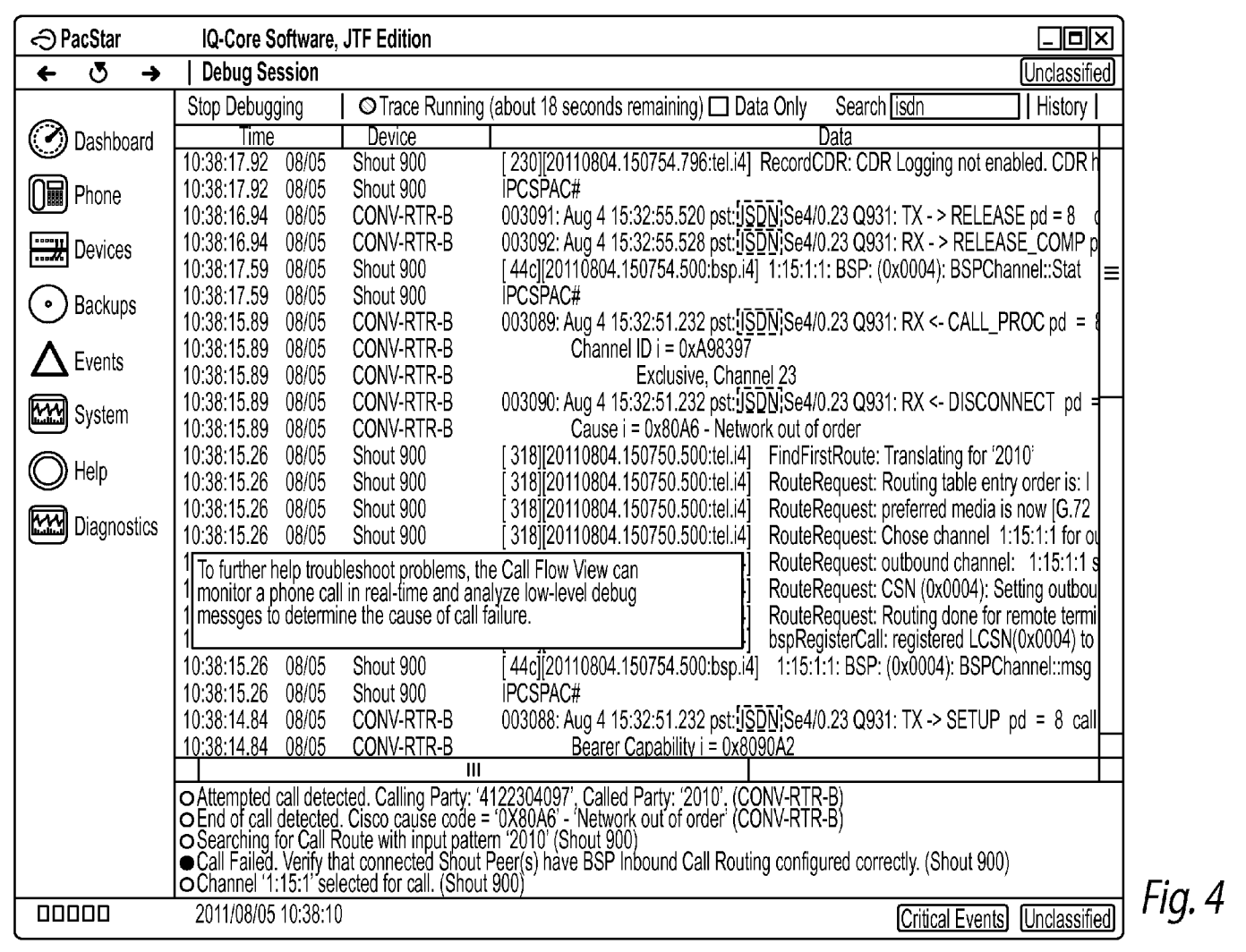

FIG. 4 illustrates an exemplary debug/trace screen showing the results of a call debug session. The results include multiple debug/trace logs from multiple network devices, and a summary at the bottom of the screen showing status, and possible causes of problems, generated by heuristics in the "on command" debug/trace portion of the invention.

DESCRIPTION

Figure 1:
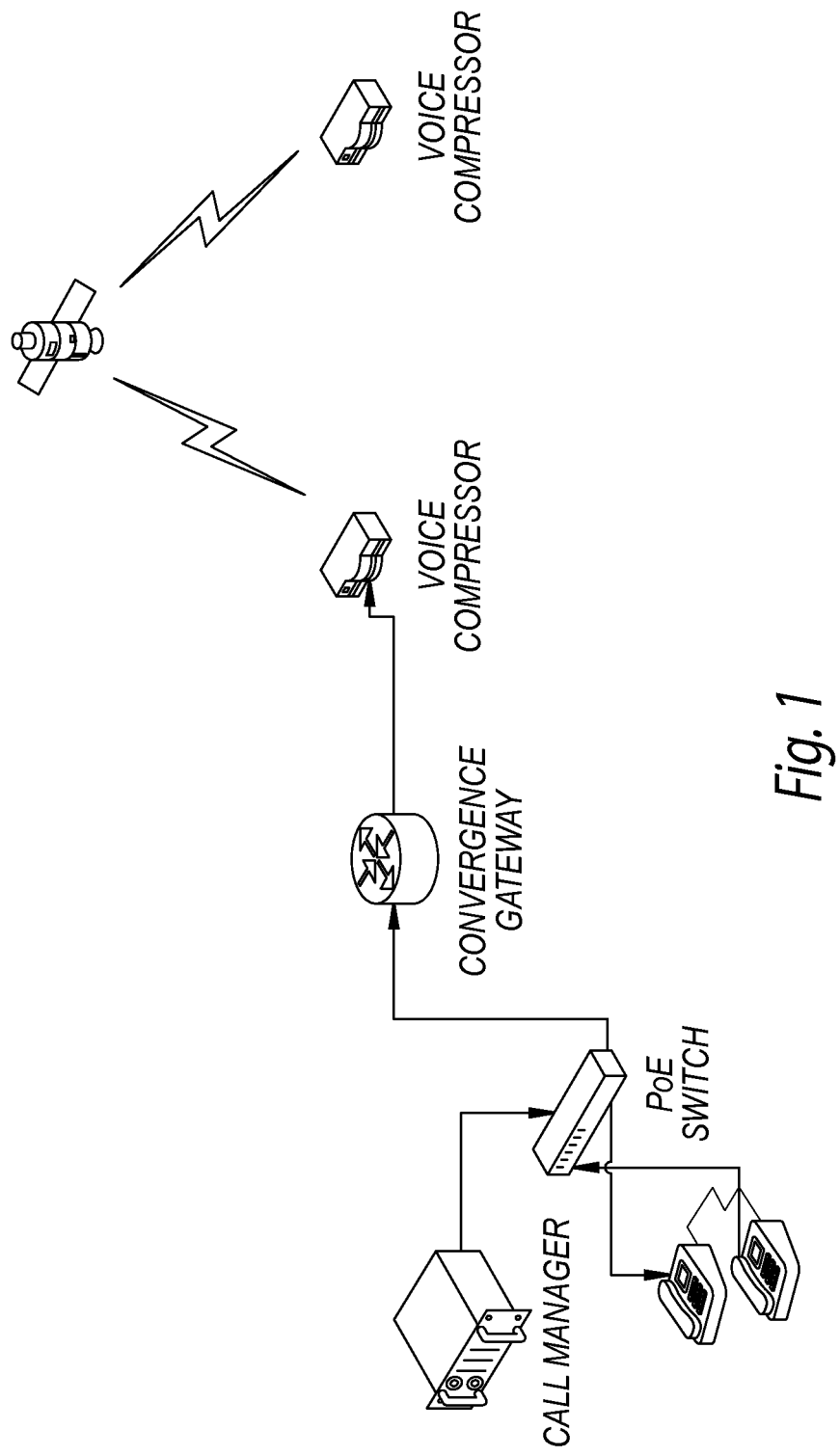
FIG. 1 illustrates a typical heterogeneous network transmitting voice/video over network routers/gateways, compressors, satcom, and switches, with a PBX deployed in a field location.
Figure 2:
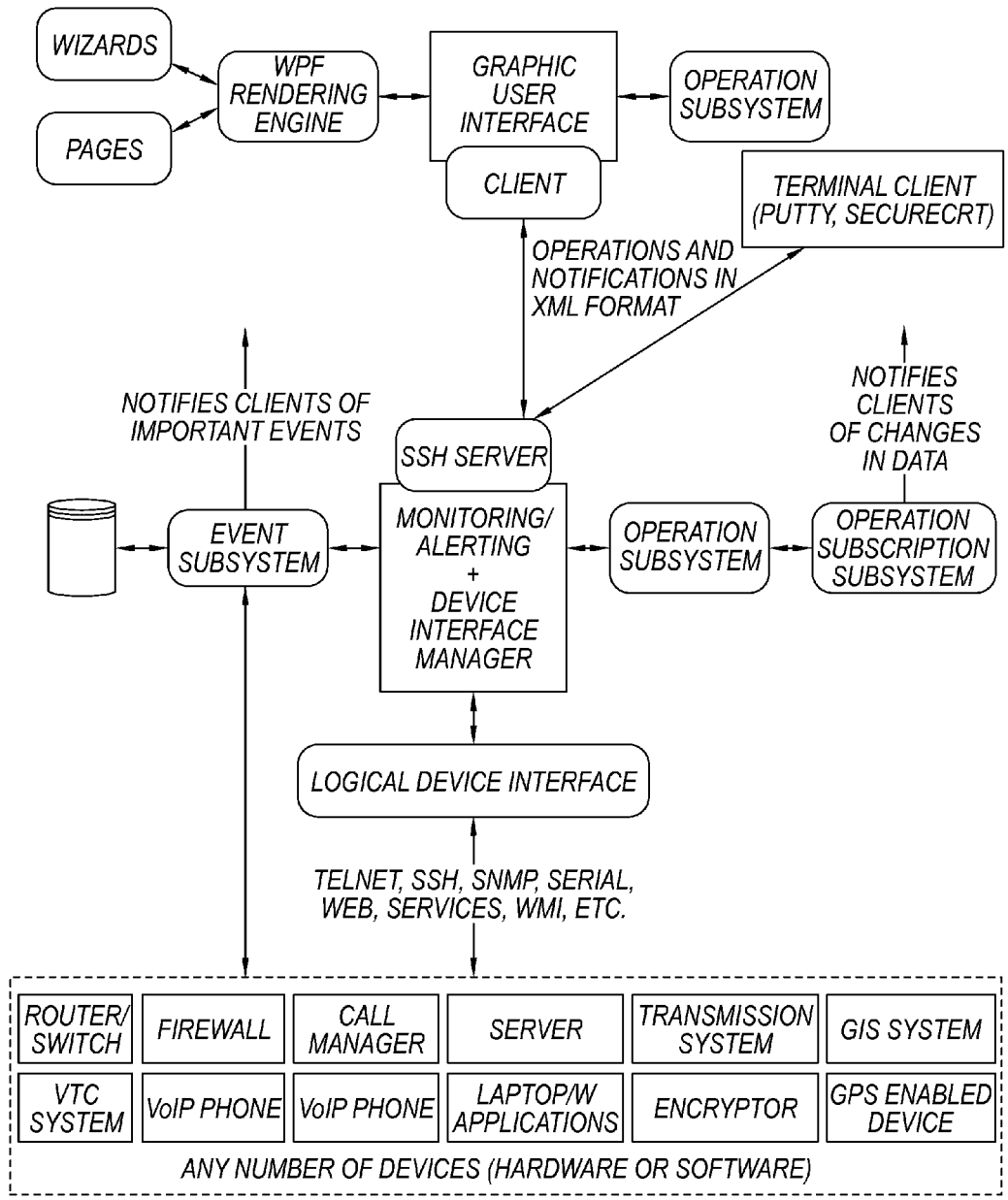
FIG. 2 illustrates a software module architecture in accordance with an embodiment of the present disclosure, showing a Graphical User Interface (GUI), monitoring components, wizard module, and device interfaces, where the GUI is operatively coupled to any number of network devices.
Figure 3:
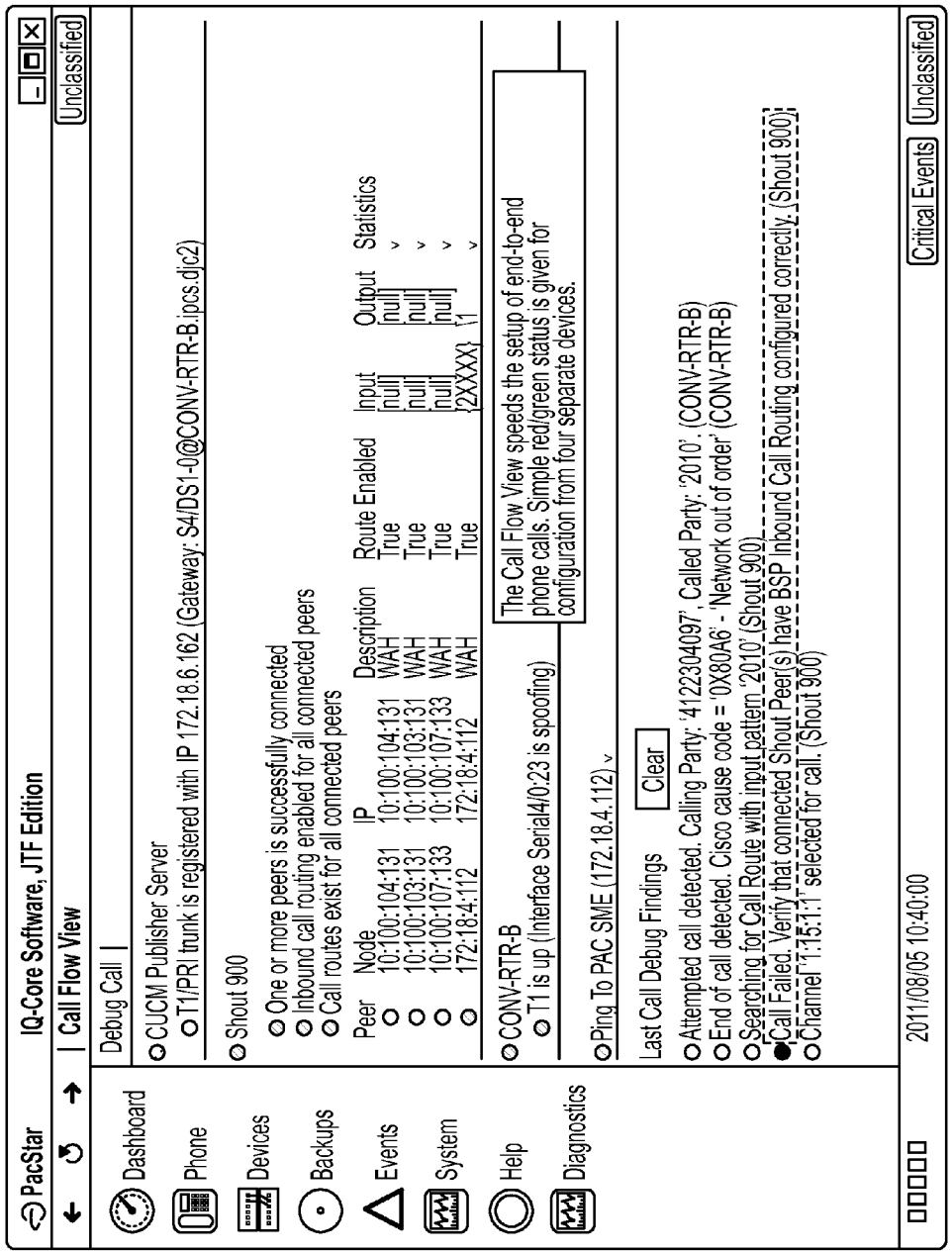
FIG. 3 illustrates real-time status monitoring of the voice/video specific states of multiple devices including the PBX (CUCM Publisher Server), Voice Packet Compressor (SHOUT 900), router/gateway (CONV-RTR-B), and HQ central gateway (PAC-SME).
Figure 5:
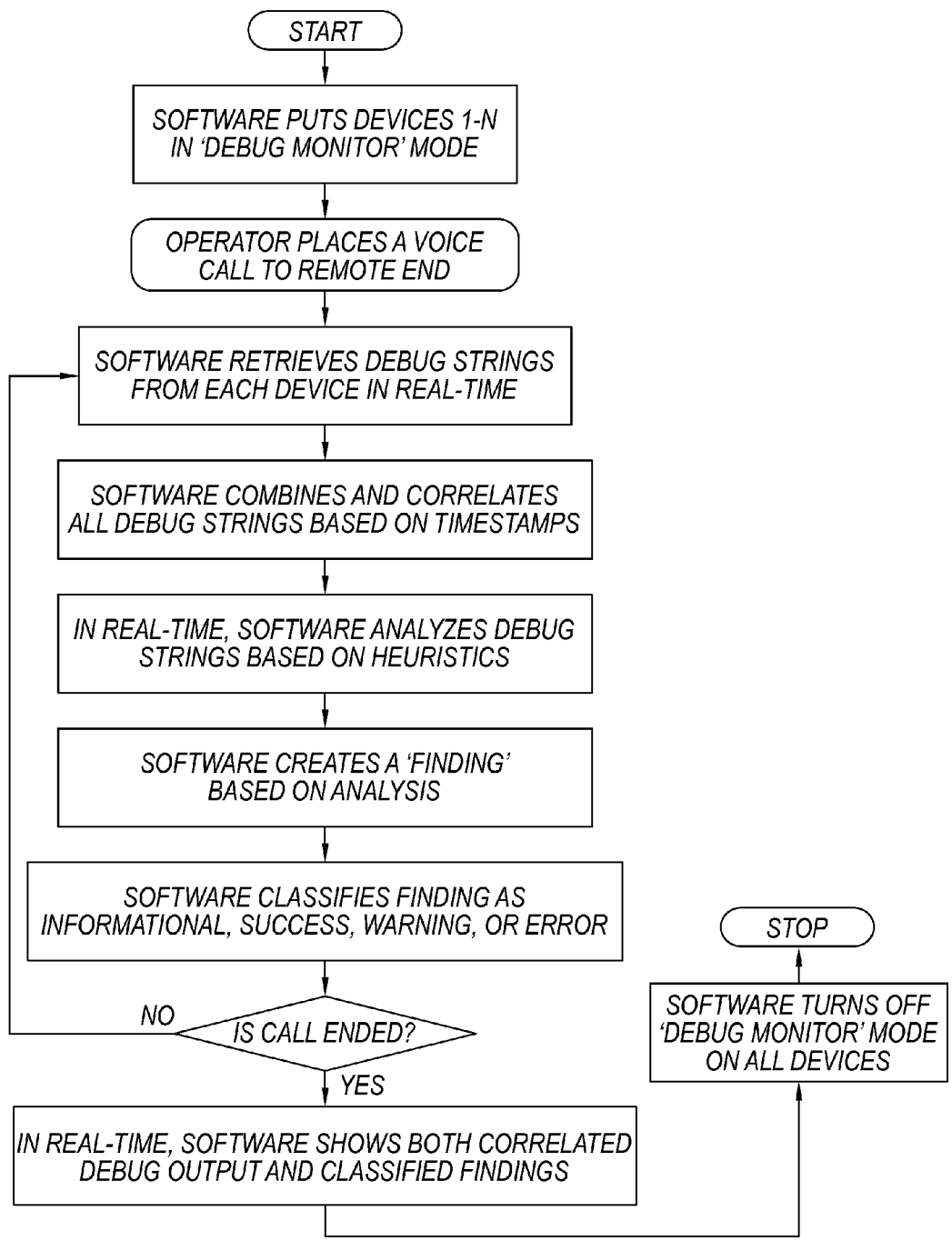
FIG. 5 illustrates the software logic flowchart implementing the invention.

The present disclosure describes systems, methods, processes and computer software in accordance with certain embodiments of the present invention. Several specific details of the invention are set forth in the following description and the Figures to provide a thorough understanding of certain embodiments of the invention. One skilled in the art, however, will understand that the present invention may have additional embodiments, and that other embodiments of the invention may be practiced without several of the specific features described below.

The technology in accordance with at least one embodiment provides the computer application software, related computer hardware and/or methods (referred to as "system") related to creating an easy-to-use user interface, automating and simplifying complex diagnostic tasks otherwise requiring manual interaction (on the part of highly trained advanced computer/network administrators) with a variety of computer network hardware components.

The system can be configured to automate (in real time) the process of diagnosing the network such that the networking devices perform correctly in environments where communication is mission critical, but where the availability of highly trained technical administrators may be limited.

The technology of an aspect of the present disclosure relates to the deployment of IT services by organizations involved in performing work, services, or collaboration in rugged locations, in locations on a temporary basis, or in locations where transmission infrastructure is limited, unreliable, or over-subscribed. These types of organizations can include military groups, emergency relief agencies or medical teams, diplomatic and aid organizations, news organizations, dignitaries and delegations of traveling officials. It also includes law enforcement and emergency management agencies responding to disaster areas. It further includes organizations involved in ensuring reliable operations of critical infrastructure such as (but not limited to) health care organizations, energy production and transmission infrastructure, agriculture, banking, and transportation. It also relates to organizations involved in remote work projects such as oil exploration and extraction, mining, overseas construction, timber harvesting, and scientific exploration.

Embodiments of the technology of the present disclosure can be configured for applications that address field operations to enable the quick establishment of full "office communications" capabilities in network-starved environments, or that address construction needs to enable quick setup of communications for field management, surveillance and other capabilities at construction locations prior to the establishment of permanent networking/computing capabilities. The technology can also be configured to address emergency backup systems configured to enable quick setup of temporary or backup networks where or when permanent IT equipment is damaged due to disaster.

Aspects of this technology provide software and/or call flow diagnostic systems configured with automated means to troubleshoot and diagnose multiple network devices, in real time, to ensure that voice/video calls can be made successfully—while providing a single, integrated user interface appropriate for novice operators.

Devices managed by the software may include transmission devices such as satcom modems/antennas, line-of-site radios, laser-based "free space optics" equipment, etc. Network equipment may include devices such as routers, switches, firewalls, VPN concentrators, MUXs, network encryptors, compression devices and WAN optimization devices, etc.

In at least one embodiment, the call flow diagnostic system and associated software manages systems having one or more transmission technologies and protocols, including but not limited to T1, xDSL, ISDN, Dial-Up, Satellite (TDMA, etc.) using any band (such as C, Ku, Ka, X, L, etc.), Free Space Optics, Microwave, GSM/3G/4G, 802.11, and WiMax Hardwired Network connections such as LAN connections.

The software can be an integrated computer application that diagnoses the state, transmission, codec (or other data transformation settings) and packet or call routing settings on a plurality of network devices, specifically displaying the parameters required for novice operators to see if the transmission settings are configured correctly. Aspects of the software and/or system can further include the ability to collect, debug, and trace information from multiple network devices, on command of the operator, during test voice/video calls. The software can use heuristics to determine likely causes of communications failures—by detecting errors reported across multiple devices. It further correlates results into an integrated status report.

The call flow diagnostic system has a graphical user interface (GUI) that may be run as a Windows, Linux, Web-based, PDA (Droid, etc), or embedded application providing monitoring and diagnostics that enables operators to use simple GUI-based actions to view summary status and run real-time diagnostics across multiple network devices. The system of at least one embodiment also includes a monitoring and alerting system and interfaces to the devices in the network via any available protocol or API to retrieve status and performance information in real time, and on command. Protocols or APIs include SNMP, WMI, HTTP, SSH, TCP/IP, UDP, Serial, RPC, and application specific protocols.

The call flow diagnostic system can also include a software application running on a laptop or server presenting a GUI with screens used to view status and diagnostic results, or a monitoring/device interface portion of the software application used to retrieve status, provide alerts, and communicate with the devices to change settings in real time. The system includes devices configured for conducting transmission, network functions, call routine, voice processing, data compression and encryption, etc. The system can also include software applications with heuristics used to detect errors through the correlation of debug, status and trace outputs from the network devices.

Aspects of the software and/or system can accomplish the "on command" debug/trace function using a process as follows:

1. Enabling trace/debug modes in the appropriate networking devices.
2. Requesting the operator place a test voice/video call.
3. Retrieving diagnostic information during and after the call from the debug/trace output from the networking devices.
4. Analyzing the logs and reporting to the operator the results.
5. Disabling debug/trace modes in the appropriate networking devices.

Although not required, aspects of the technology described herein may be implemented as computer-executable instructions, such as routines executed by a general or special purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the technology may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

The computing devices on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the instructions, data structures, and message structures may be stored or transmitted via a data transmission medium, such as a signal on a communications link and may be encrypted. Various communications links may be used, such as the Internet, a local area network, a wide area network, a point-to-point dial-up connection, a cell phone network, and so on.

Embodiments of the system may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

From the foregoing, it will be appreciated that specific embodiments of the technology have been described herein for purposes of illustration, but that various modifications may be made without deviating from the spirit and scope of the described technology. For example, the described technology is applicable to any wireless device that implements an OTA mechanism, including cellular phones, PDAs, and other wireless devices. Accordingly, the technology is not limited except as by the appended claims.

We claim:

1. A method of monitoring, diagnosing and updating a communication network having a plurality of operatively interconnected network devices, comprising the steps of
    monitoring with a monitor and alert system status, transmissions, parameters, settings and changes in the network devices of the communication network, wherein the network devices include one or more transmission technologies and protocols;
    diagnosing with the monitor and alert system state, transmission, routing, and data transformation settings of a plurality of the network devices;
    collecting, debugging, and tracing information from the plurality of network devices related to performance thereof for communication of voice or video calls via the communication network;
    determining any communications failure in or between the network devices in real time and a likely cause of the communications failure;
    determining a correction to the communications failure in real time;
    providing instructions for changes to settings of one or more of the network devices to correct the communications failure; and
    requesting via a graphical user interface that a user place a test voice or video call, and retrieving diagnostic information from the network devices during and after the call from the debug/trace output from the network device.

2. The method of claim 1, further comprising displaying to a user via a graphical user interface selected parameters related to transmission settings, and configurations, and errors therein.

3. The method of claim 1, further comprising determining with heuristics a likely cause of an error in the operation or transmissions of the network devices.

4. The method of claim 1, further comprising tracing active calls with the monitor and alert system and identifying any problems or abnormalities in operation of the network devices in real time during the active call.

5. The method of claim 1, further comprises automatically determining with the monitor and alert system whether a remote compressor of the communication network is pingable.

6. The method of claim 1, further comprising communicating with selected network devices in the communication network; wherein the selected network devices having trace/debug modes; and enabling the trace/debug modes of the network devices.

7. The method of claim 1, further comprising disabling the debug/trance modes in the selected network devices.

8. The method of claim 1, further comprising analyzing the diagnostic information, reporting data related to the analysis of the diagnostic information; and disabling the debug/trance modes in the selected network devices.

9. The method of claim 1, further comprising correlating diagnostics results into a status report, and displaying the status report to a user via the graphical user interface.

10. A method of monitoring, diagnosing and updating a communication network having a plurality of operatively interconnected network devices, comprising the steps of
monitoring with a monitor and alert system status, transmissions, parameters, settings and changes in the network devices of the communication network, wherein the network devices include one or more transmission technologies and protocols;
diagnosing with the monitor and alert system slate, transmission, routing, and data transformation settings of a plurality of the network devices;
collecting, debugging, and tracing information from the plurality of network devices related to performance thereof for communication of voice or video calls via the communication network;
determining any communications failure in or between the network devices in real time and a likely cause of the communications failure;
determining a correction to the communications failure in real time;
providing instructions for changes to settings of one or more of the network devices to correct the communications failure; and
automatically determining with the monitor and alert system whether a gateway in the communication network is operating correctly, whether transmission protocols used by the network devices are operating correctly, whether the gateway is registered with a call manager in the communication network, or whether the calls reach the gateway.

11. A method Of monitoring, diagnosing and updating a communication network having a plurality of operatively interconnected network devices, comprising the steps of
monitoring with a monitor and alert system status transmissions, parameters, settings and changes in the network devices of the communication network, wherein the network devices include one or more transmission technologies and protocols;
diagnosing with the monitor and alert system state, transmission, routing, and data transformation settings of a plurality of the network devices;
collecting, debugging, and tracing information from the plurality of network devices related to performance thereof for communication of voice or video calls via the communication network;
determining any communications failure in or between the network devices in real time and a likely cause of the communications failure;
determining a correction to the communications failure in real time;
providing instructions for changes to settings of one or more of the network devices to correct the communications failure; and
automatically determining with the monitor and alert system whether a local voice compressor in the communication network is operating correctly, whether calls reach the local voice compressor, whether the local compressor is peered with a remote voice compressor, or whether the local compressor has routes associated therewith.

12. A non-transitory computer-readable medium storing instructions that, if executed by a computing system having a processor, cause the computing system to perform operations comprising:
monitoring with a monitor and alert system status, transmissions, parameters, settings and changes in network devices of a communication network;
diagnosing in real time with the monitor and alert system a state, transmission, routing, and data transformation settings of a plurality of the network devices;
debugging and tracing information from the network devices related to performance thereof for communication of voice or video calls via the communication network;
determining any failure in or between the network devices and a likely cause of the failure; and
determining a correction to the failure in real time;
providing instructions for changes to settings of one or more of the network devices to correct the failure; and
automatically determining with the monitor and alert system whether a gateway in the communication network is operating correctly, whether transmission protocols used by the network devices are operating correctly, whether the gateway is registered with a call manager in the communication network, whether the calls reach the gateway, whether a local voice compressor in the communication network is operating correctly, whether calls reach the local voice compressor, whether the local compressor is peered with a remote voice compressor, whether the local compressor has routes associated therewith or whether a remote compressor is pingable.

13. The non-transitory computer-readable medium of claim 12, the operations further comprising displaying to a user via a graphical user interface selected parameters related to transmission settings, configurations, and errors therein.

14. The non-transitory computer-readable medium of claim 12, the operations further comprising determining with heuristics a likely cause of an error in operation or transmissions of the network devices.

15. The non-transitory computer-readable medium of claim 12, the operations further comprising tracing active calls with the monitor and alert system and identifying any problems or abnormalities in operation of the network devices in real time during the active call.

16. The non-transitory computer-readable medium of claim 12, the operations further comprising communicating with selected network devices in the communication network; wherein the selected network devices having trace/debug modes; and enabling the trace/debug modes of the network devices.

17. The non-transitory computer-readable medium of claim 16, the operations further comprising requesting via a graphical user interface that a user place a test call, and retrieving diagnostic information from the network devices during and after the call from the debug/trace output from the network device.

18. A call monitoring and diagnosing system for use with a communication network having one or more transmission devices coupled to a plurality of heterogeneous network devices incorporating one or more selected transmission technologies and protocols, and being operatively interconnected for high bandwidth, real time, feature-rich voice/video communications, comprising:
a device interface component operatively coupled to the communication network;
a monitoring and alert component coupled to the network devices via the device interface component, wherein the monitoring and alert system monitors the status and quality of transmissions, and monitors and diagnoses condition, state, transmission, transformation settings, and packet or call routing settings of a plurality of the network devices in real time, and the monitoring and alert component collects, debugs and traces information from the network devices, the monitoring and alert component being configured to provide status reports related to the communication network, the monitoring and alert component communicates with the network devices with one or more selected protocol or API to receive status and performance information in real time and on command; and a graphical user interface coupled to the monitoring and alert component and configured to provide display information to an operator related to status and diagnostics results for the network devices, and to provide alerts, instructions, and communications related to settings of the network devices and changes thereto in real time.

* * * * *